United States Patent [19]

Shim

[11] Patent Number: 6,061,142
[45] Date of Patent: May 9, 2000

[54] METHOD AND APPARATUS FOR DIRECTLY PRINTING OUT IMAGE FILES FOR PRINTER

[75] Inventor: Jang-Wook Shim, Seongnam, Rep. of Korea

[73] Assignee: SamSung Electronics Co., Ltd., Kyungki-do, Rep. of Korea

[21] Appl. No.: 08/877,477

[22] Filed: Jun. 16, 1997

[30] Foreign Application Priority Data

Jun. 14, 1996 [KR] Rep. of Korea .................. 96-21585

[51] Int. Cl.[7] .................................................. C03G 15/04
[52] U.S. Cl. .................. 358/1.14; 358/1.01; 358/1.06; 358/1.12
[58] Field of Search .......................... 395/101, 106, 395/112, 114; 358/1.01, 1.06, 1.12, 1.14

[56] References Cited

U.S. PATENT DOCUMENTS

| 5,249,288 | 9/1993 | Ippolito et al. ...................... 364/245.3 |
| 5,357,607 | 10/1994 | Sathi et al. ............................... 345/515 |
| 5,375,202 | 12/1994 | May et al. ................................. 345/511 |
| 5,454,067 | 9/1995 | Tsai ........................................ 395/106 |
| 5,461,560 | 10/1995 | Uribe ....................................... 364/188 |
| 5,490,243 | 2/1996 | Millman et al. .......................... 707/507 |
| 5,594,653 | 1/1997 | Akiyama et al. .................. 364/468.24 |
| 5,706,410 | 1/1998 | Bagley et al. ........................... 395/112 |

*Primary Examiner*—Mark R. Powell
*Assistant Examiner*—Lance W. Sealey
*Attorney, Agent, or Firm*—Robert E. Bushnell, Esq.

[57] ABSTRACT

A method and apparatus for printing provides for direct printing out of image files received from a system that is external to the printer. The method includes the step of determining whether or not a command mode of the printer at present is a Direct Image File Printing System mode, if data are inputted to the printer from a host computer that is external to the printer. The method may also include the step of converting the inputted data into an image form which can be outputted so as to print them out depending on the image file type mode. This step may occur if the command mode of the printer at present is found to be the Direct Image File Printing mode upon a result of the examination.

26 Claims, 2 Drawing Sheets

METHOD AND APPARATUS FOR DIRECTLY PRINTING OUT IMAGE FILES FOR PRINTER

CLAIM OF PRIORITY

This application makes reference to, incorporates the same herein, and claims all benefits accruing under 35 U.S.C. §119 from an application entitled METHOD FOR DIRECTLY PRINTING OUT IMAGE FILES FOR PRINTER earlier filed in the Korean Industrial Property Office on Jun. 14, 1996, and there duly assigned Ser. No. 96-21585 by that Office.

BACKGROUND OF THE INVENTION

1. Field of the Invention

The present invention relates to an image forming equipment, such as a printer. More particularly, the present invention relates to a method and apparatus for directly printing out image files received from a system that is external to the printer.

2. Description of the Related Art

Today, a printer (usually being a peripheral equipment of a computer) translates data inputted from a computer depending on the stipulated command type, and converts the translated data into an image which can be printed out by the printer. Then, the printer outputs the printed paper. Because each of data inputted to the printer from a computer has a stipulated, regular type of command, a printer must recognize which type of a data command was used in order to translate the data correctly. Therefore, a user should establish a command mode of a printer depending on the type of driver used in the computer. Typical data command types include a PCL, a Postscript, a Host-Based Driver command, etc. To work with these types, a printer should be provided with software for printing out predetermined data, conforming to the specific data command type. Further, a user must understand the function of his own printer. Even further, a computer should include at least the following two tools: an application program for editing an image to be printed, and a printer driver for converting an edited final image into a command which can be used in a printer to output it.

Yet, there is a further complication: except for an image file edited directly by most users, the application program and the printer driver are needed for printing out files stored as a specific stipulated image. Namely, users have suffered the trouble of making this double effort when printing out specific types of files which were not edited by themselves. For example, suppose the user is using the specific types of files comprising a Bit Map Image File and TIP file storing an image that conforms to a regular form. These files can mostly be borrowed or transmitted from the outside so as to print them solely out. However, there has been the inconvenience that users have had to execute an application program for reading the files in a computer and establish a driver which is interchangeable with a printer to print out the files. Among exemplars of contemporary practice on this matter of controlling printing, Millman et al. (U.S. Pat. No. 5,490,243, Data Processing System For Multi-Platform Print Control And Electronic Data Fill, Feb. 6, 1996) discuss a data processing system utilizing a controlled output of complex form in one of several different output devices without separate re-engineering of the form specification file. For instance, Step 50 of FIG. 1 selects among "production" and "desk top" and chooses the print system. Millman et al. use a separate program called the Print Manager to access the formatted form files. Millman et al. provide a method of processing information corresponding to image. May et al. (U.S. Pat. No. 5,375,202, Dispatching And Scheduling Memory Operations In An Electronic Printing System, Dec. 20, 1994) discuss a method for scheduling transfers in "a printing machine of the type having a scheduler communicating with both a first disk and a second disk." See Column 4, lines 38–53. Sathi et al. (U.S. Pat. No. 5,357,607, File Storage Process For Electronic Printing Systems Having Multiple Disks, Oct. 18, 1994) discuss an electronic printing system with plural hard disks. The system of file handling is somewhat reminiscent of May et al. (which includes a common inventor among the inventors). Cf. Column 3, lines 25–40. Ippolito et al. (U.S. Pat. No. 5,249,288, Process For Accommodating Bad Disk Pages In An Electronic Printing System, Sep. 28, 1993) discuss another electronic printing system with plural hard disks for storing system files. As is shown in FIG. 11, the decision on how to handle the file depends upon whether the file is an image file. From my study of the contemporary practice and art, I find that there is a need for an improved and effective control of printing that functions more effectively without excess use of application programs and printer drivers.

SUMMARY OF THE INVENTION

Thus, an object of the present invention is to provide an improved image forming equipment, such as a printer.

Another object and apparatus for the present invention is to provide an improved method of directly printing out image files received from a system that is external to the printer.

Another object of the present invention to provide a method of directly printing out an image file received from an external system without data conversion by a selected application program and a driver.

The foregoing and the other objects of the present invention have been attained by providing an apparatus and method for directly printing out an image file for a printer connected to a host computer, including the step of determining whether or not a present command mode of the printer is a DIFPS (Direct Image File Printing System) mode. This is to occur if data are inputted to the printer from this host computer. The method may also include the step of converting the inputted data into an image form which can be outputted to print them out depending on an image file type mode. This particular step may occur if the command mode of the printer is determined to be the DIFPS mode as a result of the aforementioned determination.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
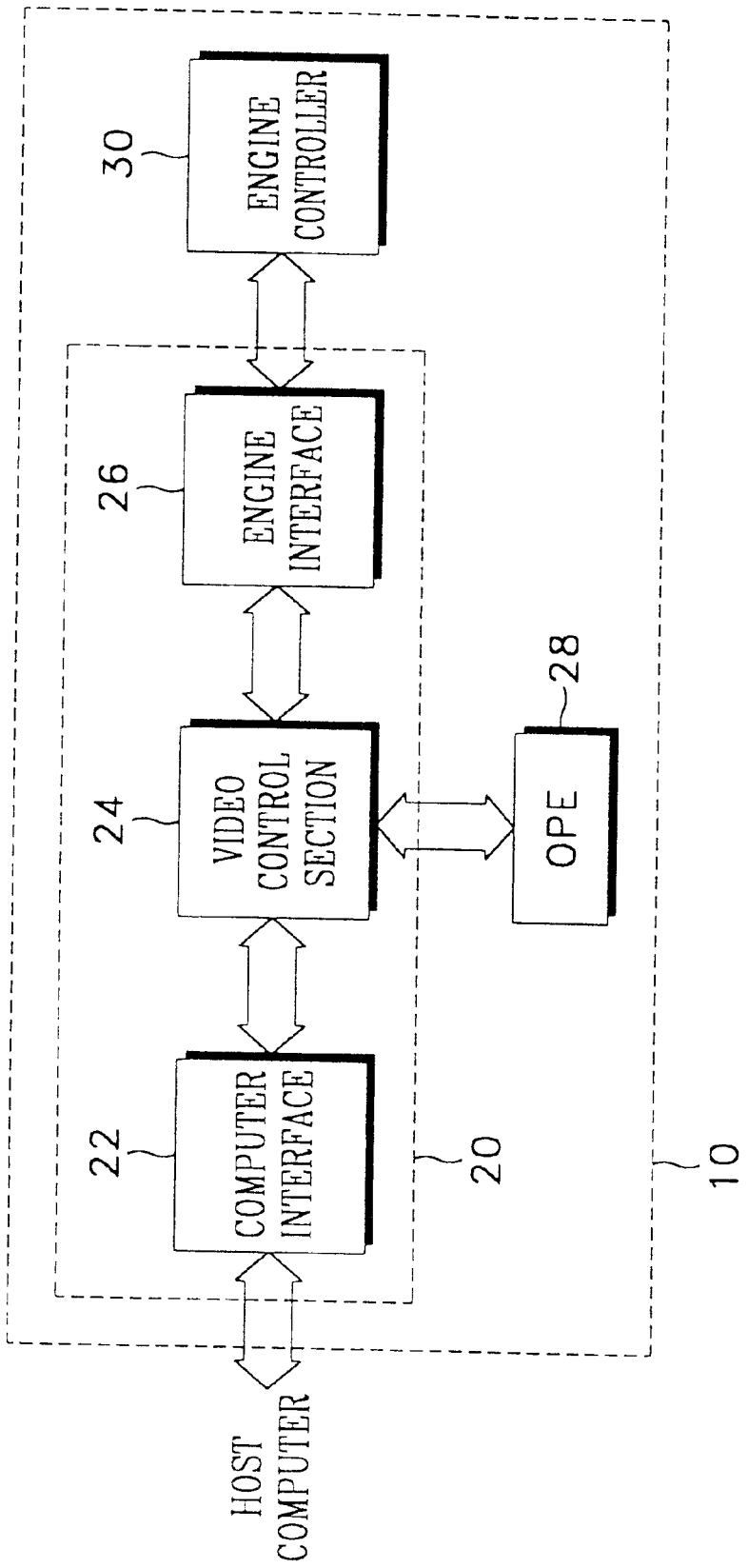
FIG. 1 is a block diagram illustrating a laser beam printer constructed to suit the principles of the present invention.

As discussed in the previous paragraphs, FIG. 1 is a block diagram showing the construction of a suitable laser beam printer for printing out an image according to data inputted to this laser beam printer from an external system, such as a host computer. Usually, the laser beam printer prints on sheets of paper. As shown in FIG. 1, a laser beam printer 10 includes a video controller 20, an engine controller 30 and an Operating Panel Equipment (hereinbelow, referred to as "OPE") 28. The video controller 20 includes a computer interface 22, a video control section 24 and an engine interface 26. The computer interface 22, which is connected between a host computer and the video control section 24, serves to interface input signals and output signals. The video control section 24 includes a ROM (read only memory) having a control program according to an embodiment of the present invention and a RAM (read/write memory or random access memory) for temporarily storing many types of data inputted to the video controller 20 from the OPE 28 and the host computer. The video control section 24 converts image files received from the computer interface 22 into image data which can be processed by a printer engine to transmit them to the engine controller 30. The engine interface 26 serves to interface input signals and output signals with the engine controller 30 under the control of the video control section 24. The OPE 28 is itself controlled by the video control section 24, and has a plurality of keys for inputting various commands and a display device. The engine controller 30, which may include a mechanism part and a circuit part, is used in printing out pictures according to image data transmitted thereto from the video control section 24, and to output them.

Figure 2:
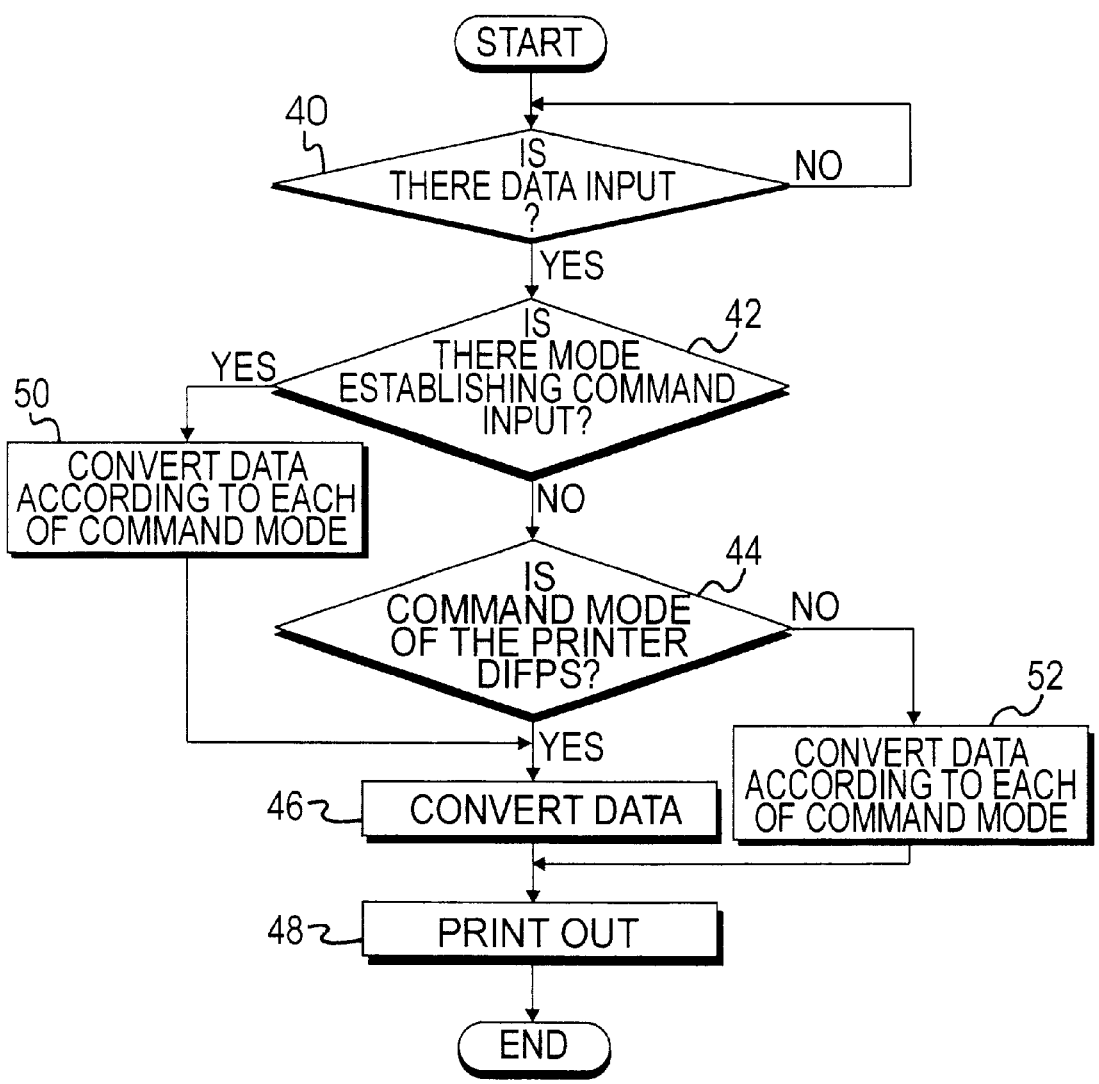
FIG. 2 is a flow chart illustrating a typical process routine for directly printing out image files received from an external system by using a video control section, according to the present invention.

FIG. 2 is a flow chart showing a control process routine executed by a video control section for directly printing out image files received from an external system. An explanation of the operation according to an embodiment of the present invention is given hereinafter with reference to FIG. 1 and FIG. 2.

At the beginning of this routine, at step 40, video control section 24 determines whether or not there is data input if predetermined data are transmitted to a laser beam printer 10 from a host computer connected to laser beam printer 10. If it is determined at step 40 that this data input does exist, then the program proceeds to step 42.

At step 42, a video control section 24 determines whether or not there is a command input for establishing a mode. This determination as to the existence of a mode establishing command input can be carried out in more than one way. For example, the existence of such a mode may be determined by allowing users to examine whether or not there is key data reception for establishing a Direct Image File Printing System (hereinbelow, referred to as DIFPS) mode. Alternatively, the users may be allowed to select a specific command mode, such as a PLC and Postscript command, etc. through the OPE 28.

If it is determined at step 42 that a mode establishing command input does not exist, then the program proceeds to step 44. At step 44, a video control section 24 determines whether or not a command mode of the laser beam printer 10 at present is the DIFPS mode. If the answer to this is "YES" (i.e., if a command mode of the laser beam printer 10 at present is the DIFPS mode), then the program proceeds to step 46 at which a video control section 24 converts data being inputted into an image form which can be outputted depending on an image file type mode. At step 46, for example, if the image file type mode of the printer 10 at present is a BMP file type, video control section 24 converts the inputted data into bit map image depending on the BMP file type. After that, the program proceeds to step 48.

In contrast, if it is determined that a command mode of the laser beam printer 10 at present is not the DIFPS mode, then the program proceeds to step 52 at which video control section 24 converts data according to each command mode, i.e., PCL and Postscript into an image form which can be outputted, and then it proceeds to step 48.

If it is determined at step 42 that a mode establishing command input from the OPE 28 does exist, then the program proceeds to step 50 where video control section 24 establishes a relevant command mode inputted and image file. After that, the program proceeds to step 46 at which video control section 24 converts data inputted at step 40 into an image form which can be outputted depending on an image file type mode, and then it proceeds to step 48.

At step 48, video control section 24 controls engine controller 30 via engine interface 26 so that it can print out the inputted data which have been converted. Then, the program is concluded.

As described previously, the present invention offers the function of directly printing out an image file inputted to a printer without an application program and a printer driver that is supported from a host computer. This is done by further applying a DIFPS mode to the software of the printer. Furthermore, the present invention has that advantage that during the printing process of image files, users can print out image files by merely using a printing instruction of a DOS command or a general OS command—without executing an extra application program and a printer driver. This increases the convenience to the users. During the previous description of the present invention, an example of a laser beam printer has been used to illustrate an embodiment of the present invention, and yet the present invention may also be applied to other printers (e.g., an ink jet printer, dot matrix printer) receiving image files from an external system, such as a host computer, without having any modifications.

While there have been illustrated and described what are considered to be preferred embodiments of the present invention, it will be understood by those skilled in the art that various changes and modifications and equivalents may be substituted for elements thereof without departing from the true scope of the present invention. Therefore, it is intended that the present invention not be limited to the particular embodiments disclosed as the best mode contemplated for carrying out the present invention, but that the present invention embraces all alternatives, modifications and variances falling within the scope of the appended claims.

What is claimed is:

1. A method for printing out an image file for a printer connected to a host computer, comprising the steps of:

determining whether data are inputted to said printer, through a computer interface of said printer, as inputted data from said computer;

determining whether a command mode is present at said printer, said command mode establishing a command input containing information regarding an operation of said printer;

when a command mode is determined to be present at said printer and said inputted data are inputted to said printer from said host computer, determining whether said command mode is a Direct Image File Printing System mode, said Direct Image File Printing System mode permitting direct printing of said image file without executing an application program for reading said host computer and without establishing a printer driver for printing said image file;

when no command mode is determined to be present at said printer, establishing a command mode at said printer and establishing said image file;

after said step of determining whether said command mode is a Direct Image File Printing System mode, when said command mode of said printer is said Direct Image File Printing System mode, converting said inputted data into converted data of a first type among types of converted data, said converted data of said first type being of an image form to be outputted to print in dependence upon an image file type mode;

after said step of determining whether said command mode is a Direct Image File Printing System mode, when said command mode of said printer is not said Direct Image File Printing System mode, converting said inputted data into converted data of one of said types of converted data in accordance with said command mode; and after said steps of converting said inputted data, printing said converted data.

2. The method of claim 1, wherein during said step of converting said inputted data into said converted data of said first type among types of converted data, when said image file type mode indicates a bit map file type, a video control section of said printer converts said inputted data into a bit map image in accordance with said bit map file type.

3. The method of claim 1, wherein during said step of printing said converted data, a video control section of said printer controls an engine controller of said printer to print said converted data, said video control section having a read only memory for storing a control program, said engine controller having a circuit part and a mechanism part to print in accordance with said control program of said video control section.

4. The method of claim 1, wherein during said step of determining whether a command mode is present at said printer, said printer examines whether a key input for said command mode has been selected and examines which command mode has been selected.

5. The method of claim 1, wherein after said step of determining whether data are inputted to said printer from said computer, when no data has been inputted, then said printer awaits said data before a printing operation.

6. The method of claim 2, wherein after said step of determining whether data are inputted to said printer from said computer, when no data has been inputted, then said printer awaits said data before a printing operation.

7. The method of claim 3, wherein after said step of determining whether data are inputted to said printer from said computer, when no data has been inputted, then said printer awaits said data before a printing operation.

8. The method of claim 1, wherein said Direct Image File Printing System mode is set and released upon key inputs from keys of an operating panel.

9. The method of claim 8, wherein during said step of converting said inputted data into said converted data of said first type among types of converted data, when said image file type mode indicates a bit map file type, a video control section of said printer converts said inputted data into a bit map image in accordance with said bit map file type.

10. The method of claim 8, wherein during said step of printing said converted data, a video control section of said printer controls an engine controller of said printer to print said converted data, said video control section having a read only memory for storing a control program, said engine controller having a circuit part and a mechanism part to print in accordance with said control program of said video control section.

11. The method of claim 8, wherein during said step of determining whether a command mode is present at said printer, said printer examines whether a key input for said command mode has been selected and examines which command mode has been selected.

12. An apparatus for printing out an image file for a printer connected to a host computer, comprising:

means for determining whether data are inputted to said printer from said computer;

means for determining whether a command mode is present at said printer, said command mode establishing a command input containing information regarding an operation of said printer;

means for determining whether said command mode is a Direct Image File Printing System mode when a command mode is at said printer and said inputted data are inputted to said printer from said host computer, said Direct Image File Printing System mode permitting direct printing of said image file without executing an application program for reading said host computer and without establishing a printer driver for printing said image file;

means for establishing a command mode at said printer and establishing said image file when no command mode is present at said printer;

means for converting said inputted data into converted data of a first type among types of converted data after determining that said command mode of said printer is said Direct Image File Printing System mode, said converted data of said first type being of an image form to be outputted to print in dependence upon an image file type mode;

means for converting said inputted data into converted data of one of said types of converted data in accordance with said command mode after determining that said command mode of said printer at present is not said Direct Image File Printing System mode; and means for printing said converted data after converting said inputted data.

13. The apparatus of claim 12, further comprising a video control section, wherein during an operation of said means for converting said inputted data into said converted data of said first type among types of converted data, when said image file type mode indicates a bit map file type, said video control section converts said inputted data into a bit map image in accordance with said bit map file type.

14. The apparatus of claim 12, further comprising a video control section and an engine controller, wherein during an operation of said means for printing said converted data, said video control section controls said engine controller to print said converted data, said video control section having a read only memory for storing a control program, said engine controller having a circuit part and a mechanism part to print in accordance with said control program of said video control section.

15. The apparatus of claim 12, wherein during an operation of said means for determining whether a command mode is present at said printer, said printer examines whether a key input for said command mode has been selected and examines which command mode has been selected.

16. The apparatus of claim 12, wherein after an operation of said means for determining whether data are inputted to said printer from said computer, when no data has been inputted, then said printer awaits said data before a printing operation.

17. The apparatus of claim 12, wherein said Direct Image File Printing System mode is set and released upon key inputs from keys of an operating panel.

18. A printing apparatus for printing out an image file sent from a host computer to a printer, comprising:

a computer interface for receiving inputted data from said computer and for transmitting commands keyed by a user to said computer;

a video control section for determining whether a command mode is present at said printer, said command mode establishing a command input containing information regarding an operation of said printer, and for determining whether said command mode is a Direct Image File Printing System mode when a command mode is determined to be present at said printer and said inputted data are inputted to said printer from said host computer, said Direct Image File Printing System mode permitting direct printing of said image file without executing an application program for reading said host computer and without establishing a printer driver for printing said image file;

an engine interface for receiving converted data from said video control section upon converting of said inputted data into said converted data of a first type among types of converted data when, after determining that said command mode of said printer is said Direct Image File Printing System mode, said converted data of said first type being of an image form to be outputted to print in dependence upon an image file type mode; and an engine controller for receiving said converted data and for controlling printing of said converted data after converting said inputted data.

19. The apparatus of claim 18, wherein said Direct Image File Printing System mode is set and released upon key inputs from an operating panel.

20. The apparatus of claim 19, wherein said operating panel comprises:

a plurality of keys to permit said key inputs; and a display device to display information regarding the apparatus.

21. The apparatus of claim 18, wherein said video control section establishes a command mode at said printer and establishes said image file when it is determined, by said video control section, that no command mode is present at said printer.

22. The apparatus of claim 18, wherein during said step of converting said inputted data into said converted data of said first type among types of converted data, when said image file type mode indicates a bit map file type, said video control section of said printer converts said inputted data into a bit map image in accordance with said bit map file type.

23. The apparatus of claim 18, wherein said video control section includes a read only memory for storing a control program, said engine controller having a circuit part and a mechanism part to print in accordance with said control program of said video control section.

24. The apparatus of claim 18, wherein during said step of determining whether a command mode is present at said printer, said printer examines whether a key input for said command mode has been selected and examines which command mode has been selected.

25. The apparatus of claim 18, wherein after said step of determining whether data are inputted to said printer from said computer, when no data has been inputted, then said printer awaits said data before a printing operation.

26. The apparatus of claim 18, further comprising an operating panel, said Direct Image File Printing System mode being set and released upon key inputs from keys of said operating panel.

* * * * *